US011958993B2

(12) United States Patent
Nam et al.

(10) Patent No.: US 11,958,993 B2
(45) Date of Patent: Apr. 16, 2024

(54) ADHESIVE PROTECTIVE FILM, OPTICAL MEMBER COMPRISING THE SAME AND OPTICAL DISPLAY COMPRISING THE SAME

(71) Applicant: Samsung SDI Co., Ltd., Yongin-si (KR)

(72) Inventors: Irina Nam, Suwon-si (KR); Tae Ji Kim, Suwon-si (KR); Won Kim, Suwon-si (KR); Il Jin Kim, Suwon-si (KR); Jung Hyo Lee, Suwon-si (KR); Oh Hyeon Hwang, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 204 days.

(21) Appl. No.: 17/332,566

(22) Filed: May 27, 2021

(65) Prior Publication Data
US 2021/0371713 A1 Dec. 2, 2021

(30) Foreign Application Priority Data

May 29, 2020 (KR) .................. 10-2020-0065488

(51) Int. Cl.
*C09J 133/08* (2006.01)
*B32B 27/30* (2006.01)
(Continued)

(52) U.S. Cl.
CPC ........... *C09J 133/08* (2013.01); *B32B 27/308* (2013.01); *C09J 7/30* (2018.01); *C09J 151/085* (2013.01);
(Continued)

(58) Field of Classification Search
CPC .. C09J 139/06; C09J 2433/00; C09J 2483/00; C09J 133/08; C09J 133/066; C08L 43/04;
(Continued)

(56) References Cited

U.S. PATENT DOCUMENTS 5,066,751 A 11/1991 Kotachi et al.
2003/0236375 A1 12/2003 SalamOne et al.
(Continued)

FOREIGN PATENT DOCUMENTS

CN 101747860 A 6/2010
CN 103055315 A 4/2013
(Continued)

OTHER PUBLICATIONS

Korean Office Action dated Oct. 21, 2022 issued in corresponding KR Application No. 10-2020-00065488 (5 pages).
(Continued)

*Primary Examiner* — Eli D. Strah
(74) *Attorney, Agent, or Firm* — Lewis Roca Rothgerber Christie LLP

(57) ABSTRACT

Disclosed herein are an adhesive protective film, an optical member including the same, and an optical display including the same. An adhesive protective film is formed of a composition including a (meth)acrylic binder derived from a monomer mixture including: an alkyl group-containing (meth)acrylic monomer; and at least one selected from among a hydroxyl group-containing (meth)acrylic monomer, a carboxyl group-containing (meth)acrylic monomer, and a polysiloxane (meth)acrylate, the adhesive protective film having an initial peel strength of about 100 gf/inch or less and a peel strength decrease rate of about 50% or less, as calculated according to Equation 1.

22 Claims, 1 Drawing Sheet

(51) Int. Cl.
*C09J 7/30* (2018.01)
*C09J 151/08* (2006.01)

(52) U.S. Cl.
CPC ..... *B32B 2307/748* (2013.01); *B32B 2457/20* (2013.01); *B32B 2457/202* (2013.01); *B32B 2457/206* (2013.01); *C09J 2301/312* (2020.08); *C09K 2323/053* (2020.08); *C09K 2323/057* (2020.08)

(58) Field of Classification Search
CPC ............................ C08L 51/085; C08F 220/14; C08F 220/1808; C08F 226/10; C08F 220/06; C08F 220/20; C08F 290/068; C08F 220/1818
See application file for complete search history.

(56) References Cited

U.S. PATENT DOCUMENTS

| | | | |
|---|---|---|---|
| 2006/0057222 | A1 | 3/2006 | Linhardt et al. |
| 2009/0075008 | A1 | 3/2009 | Hwang et al. |
| 2012/0125431 | A1 | 5/2012 | Ozum et al. |
| 2014/0194572 | A1 | 7/2014 | Matsumoto et al. |
| 2015/0056757 | A1 | 2/2015 | Liu et al. |
| 2015/0252125 | A1 | 9/2015 | Moro et al. |
| 2015/0280151 | A1 | 10/2015 | Nam et al. |
| 2017/0253769 | A1 | 9/2017 | Cho et al. |
| 2018/0342674 | A1 | 11/2018 | Nam et al. |
| 2019/0071589 | A1* | 3/2019 | Ieda ............... B32B 27/10 |
| 2020/0347269 | A1* | 11/2020 | Kim ................ C09J 7/401 |
| 2021/0147721 | A1 | 5/2021 | Kang et al. |
| 2021/0277292 | A1 | 9/2021 | Kim et al. |
| 2021/0284877 | A1 | 9/2021 | Han et al. |
| 2021/0371713 | A1 | 12/2021 | Nam et al. |

FOREIGN PATENT DOCUMENTS

| | | | |
|---|---|---|---|
| CN | 103309162 A | 9/2013 | |
| CN | 104379621 A | 2/2015 | |
| CN | 104903976 A | 9/2015 | |
| CN | 105567137 A | 5/2016 | |
| CN | 107163865 A | 9/2017 | |
| CN | 107304338 A | 10/2017 | |
| CN | 110484170 A | 11/2019 | |
| CN | 111019566 A | 4/2020 | |
| DE | 102009003223 A1 | 12/2010 | |
| JP | 2-258815 A | 10/1990 | |
| JP | 2007-314758 A | 12/2007 | |
| JP | 2008-210845 A | 9/2008 | |
| JP | 2012-158633 A | 8/2012 | |
| JP | 2013-076097 A | 4/2013 | |
| JP | 2013-213206 A | 10/2013 | |
| JP | 2014-189716 A | 10/2014 | |
| JP | 2015-189977 A | 11/2015 | |
| JP | 2016014827 A * | 1/2016 | ............ C09J 11/06 |
| JP | 2019-104193 A | 6/2019 | |
| KR | 10-2007-0055363 A | 5/2007 | |
| KR | 10-2011-0020133 A | 3/2011 | |
| KR | 10-2011-0071039 A | 6/2011 | |
| KR | 10-2013-0078599 A | 7/2013 | |
| KR | 10-2014-0034882 A | 3/2014 | |
| KR | 10-2015-0059127 A | 5/2015 | |
| KR | 10-2015-0105897 A | 9/2015 | |
| KR | 10-2015-0114400 A | 10/2015 | |
| KR | 10-2016-0004928 A | 1/2016 | |
| KR | 10-2017-0114642 A | 10/2017 | |
| KR | 10-2019-0028032 A | 3/2019 | |
| KR | 2019-0037137 A | 4/2019 | |
| KR | 10-2020-0006873 A | 1/2020 | |
| TW | 202016250 A | 5/2020 | |
| WO | WO 2018/078952 A1 | 5/2018 | |
| WO | WO 2019/045479 A1 | 3/2019 | |
| WO | WO-2019045479 A1 * | 3/2019 | ............ C08F 2/50 |

OTHER PUBLICATIONS

Taiwan Office action dated Jan. 24, 2022 issued in corresponding TW Patent Application No. 110119333, 5 pages.
Aiqing, Z., "Pressure Sensitive Adhesives", 1st edition, Chemical Industry Press, (English abstract) (pp. 150-153, 161-162), Sep. 2002.
Chinese First Office Action, and partial machine English translation, dated Aug. 16, 2019 in the corresponding Chinese Patent Application No. 201680061108.9, 12 pages.
Chinese Office Action in corresponding Chinese Application No. 201880055979.9, with English translation (13 pgs.), Chinese Office Action dated Jun. 2, 2021 (11 pgs.).
Chinese Office action dated Jul. 22, 2022 issued in corresponding CN Application No. 202110211541.9, 8 pages.
International Search Report dated Mar. 28, 2017 for PCT/KR2016/009430, filed on Aug. 25, 2016 (3 pages).
Japanese Notice of Reasons for Refusal, for Patent Application No. 2018-518429, dated Apr. 28, 2020, 3 pages.
Kawahara et al, JP 2012-158633 Machine Translation, Aug. 23, 2012 (Year: 2012).
Lee et al, KR 1020150059127 Machine Translation, May 29, 2015 (Year: 2015).
Nakajima et al, CN 104379621 Machine Translation, Feb. 25, 2015 (Year: 2015).
Nakamura et al, JP 2014-189716 Machine Translation, Jun. 10, 2014 (Year: 2014).
"Silicones for Resin Modification", ShinEtsu, Oct. 2010, pp. 1-12.
U.S. Final Office Action from U.S. Appl. No. 16/642,831, dated Nov. 14, 2022, 18 pages.
U.S. Notice of Allowance from U.S. Appl. No. 15/769,496, dated Nov. 8, 2022, 10 pages.
U.S. Office Action from U.S. Appl. No. 15/769,496, dated Feb. 24, 2021, 3 pages.
U.S. Office Action from U.S. Appl. No. 15/769,496, dated May 15, 2020, 16 pages.
U.S. Office Action from U.S. Appl. No. 15/769,496, dated May 2, 2022, 21 pages.
U.S. Final Office Action from U.S. Appl. No. 15/769,496, dated Nov. 13, 2020, 13 pages.
U.S. Office Action from U.S. Appl. No. 16/642,831, dated Aug. 1, 2022, 16 pages.
U.S. Office Action from U.S. Appl. No. 17/185,569, dated Sep. 1, 2022, 11 pages.
U.S. Notice of Allowance from U.S. Appl. No. 17/185,569 dated Jan. 25, 2023, 8 pages.
U.S. Notice of Allowance from U.S. Appl. No. 16/642,831, dated Feb. 1, 2023, 10 pages.

* cited by examiner

ADHESIVE PROTECTIVE FILM, OPTICAL MEMBER COMPRISING THE SAME AND OPTICAL DISPLAY COMPRISING THE SAME

CROSS-REFERENCE TO RELATED APPLICATION

This application claims priority to and the benefit of Korean Patent Application No. 10-2020-0065488, filed on May 29, 2020 in the Korean Intellectual Property Office, the entire disclosure of which is incorporated herein by reference.

BACKGROUND

1. Field

Aspects of embodiments of the present invention relate to an adhesive protective film, an optical member including the same, and an optical display including the same.

2. Description of Related Art

Adhesive films have been used to adhesively bond an adherend to another adherend. Recently, adhesive films are also used to protect an adherend. Such an adhesive film is temporarily attached to an adherend and is removed from the adherend when no longer needed. For example, there are cases in which the adhesive film is attached to an adherend having foreign matter thereon or there is misalignment between the adhesive film and an adherend. Thus, the adhesive film needs to have low peel strength with respect to an adherend to facilitate removal thereof from the adherend. However, when adhesive films are used only for this purpose, there can be problems of deterioration in economic feasibility and processability associated with disposal of the adhesive films.

Accordingly, in the absence of problems such as the presence of foreign matter on an adherend or misalignment between an adhesive film and an adherend, it is possible to consider using the adhesive film as a permanent protective film for an adherend. To this end, the adhesive film needs to have high peel strength with respect to an adherend. In particular, when put into use as a protective film for an adherend, the adhesive film needs to have high peel strength at high temperatures, as well as when secured to the adherend.

The background technique of the present invention is disclosed in Korean Patent Laid-open Publication No. 2019-0037137.

SUMMARY

According to an aspect of embodiments of the present invention, an adhesive protective film that can be easily removed from an optical member after being adhesively bonded to the optical member and can be secured to the optical member through a process (e.g., a predetermined process) is provided.

According to another aspect of embodiments of the present invention, an adhesive protective film that can reduce decrease in peel strength at high temperature relative to peel strength at room temperature while having high peel strength at high temperature is provided.

According to another aspect of embodiments of the present invention, an adhesive protective film that can increase durability of an optical member when secured to the optical member is provided.

According to another aspect of embodiments of the present invention, an adhesive protective film that has a low haze level is provided.

According to another aspect of embodiments of the present invention, an adhesive protective film that has good anti-scattering properties through reduction in particle scattering during a cutting process is provided.

An aspect of one or more embodiments of the present invention relates to an adhesive protective film.

The adhesive protective film is formed of a composition including a (meth)acrylic binder derived from a monomer mixture including: an alkyl group-containing (meth)acrylic monomer; and at least one selected from among a hydroxyl group-containing (meth)acrylic monomer, a carboxyl group-containing (meth)acrylic monomer, and a polysiloxane (meth)acrylate, the adhesive protective film having an initial peel strength of about 100 gf/inch or less, and a peel strength decrease rate of about 50% or less, as calculated according to the following Equation 1:

Peel strength decrease rate=[|peel strength at high temperature−post-heating peel strength|/post-heating peel strength]×100, where, in Equation 1, the post-heating peel strength is a peel strength (unit: gf/inch) of the adhesive protective film, as measured at 25° C. after leaving a specimen prepared by adhesively bonding the adhesive protective film to an adherend at 50° C. for 1,000 seconds and at 25° C. for 30 minutes, and the peel strength at high temperature is a peel strength (unit: gf/inch) of the adhesive protective film, as measured at 85° C. after leaving a specimen prepared by adhesively bonding the adhesive protective film to an adherend at 85° C. for 60 minutes.

In one or more embodiments, the peel strength at high temperature in Equation 1 may have a value of about 400 gf/inch or more.

In one or more embodiments, the post-heating peel strength in Equation 1 may have a value of about 500 gf/inch or more.

In one or more embodiments, the adhesive protective film may have an acid value of greater than about 0 mgKOH/g to about 15 mgKOH/g.

In one or more embodiments, the adhesive protective film may have a glass transition temperature of about −35° C. to about −10° C.

In one or more embodiments, the composition may include a (meth)acrylic binder derived from the monomer mixture including the carboxyl group-containing (meth)acrylic monomer.

In one or more embodiments, the carboxyl group-containing (meth)acrylic monomer may be present in an amount of about 0.1 mol % to about 5 mol % in the (meth)acrylic binder.

In one or more embodiments, the composition may include a (meth)acrylic binder derived from the monomer mixture including the polysiloxane (meth)acrylate.

In one or more embodiments, the polysiloxane (meth)acrylate may be present in an amount of about 0.001 mol % to about 1 mol % in the (meth)acrylic binder.

In one or more embodiments, the polysiloxane (meth)acrylate may include a compound represented by the following Formula 1:

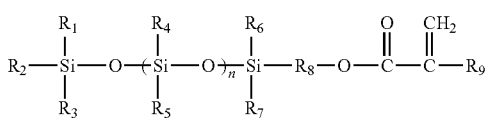

where, in Formula 1, $R_1$, $R_2$, $R_3$, $R_4$, $R_5$, $R_6$, and $R_7$ are each independently hydrogen, a $C_1$ to $C_{10}$ alkyl group, a $C_3$ to $C_{10}$ cycloalkyl group, or a $C_6$ to $C_{10}$ aryl group, $R_8$ is a $C_1$ to $C_{10}$ alkylene group, a $C_6$ to $C_{10}$ arylene group, or a $C_1$ to $C_{10}$ alkyleneoxy group, $R_9$ is hydrogen or a methyl group, and n is an integer from 1 to 100.

In one or more embodiments, the alkyl group-containing (meth)acrylic monomer may include at least one selected from among a $C_1$ to $C_{15}$ linear or branched alkyl group-containing (meth)acrylic monomer and a $C_{16}$ to $C_{22}$ linear or branched alkyl group-containing (meth)acrylic monomer.

In one or more embodiments, the alkyl group-containing (meth)acrylic monomer may be present in an amount of about 50 mol % to about 98 mol % in the (meth)acrylic binder, and the hydroxyl group-containing (meth)acrylic monomer may be present in an amount of about 0.01 mol % to about 45 mol % in the (meth)acrylic binder.

In one or more embodiments, the composition may include a mixture of a first (meth)acrylic binder derived from a monomer mixture including the alkyl group-containing (meth)acrylic monomer, the hydroxyl group-containing (meth)acrylic monomer, and the carboxyl group-containing (meth)acrylic monomer and a second (meth)acrylic binder derived from a monomer mixture including the alkyl group-containing (meth)acrylic monomer and the polysiloxane (meth)acrylate.

In one or more embodiments, the alkyl group-containing (meth)acrylic monomer in the monomer mixture for the first (meth)acrylic binder may include a $C_1$ to $C_{15}$ linear or branched alkyl group-containing (meth)acrylic monomer.

In one or more embodiments, the monomer mixture may include about 60 mol % to about 98 mol % of the $C_1$ to $C_{15}$ linear or branched alkyl group-containing (meth)acrylic monomer, about 0.1 mol % to about 35 mol % of the hydroxyl group-containing (meth)acrylic monomer, and about 1 mol % to about 13 mol % of the carboxyl group-containing (meth)acrylic monomer.

In one or more embodiments, the monomer mixture may further include an amide group-containing monomer.

In one or more embodiments, the amide group-containing monomer may include a pyrrolidonyl group-containing monomer.

In one or more embodiments, the amide group-containing monomer may be present in an amount of about 0.1 mol % to about 20 mol % in the monomer mixture.

In one or more embodiments, the alkyl group-containing (meth)acrylic monomer in the monomer mixture for the second (meth)acrylic binder may include a $C_{16}$ to $C_{22}$ linear or branched alkyl group-containing (meth)acrylic monomer.

In one or more embodiments, the monomer mixture for the second (meth)acrylic binder may include about 90 mol % to about 98.99 mol % of the $C_{16}$ to $C_{22}$ linear or branched alkyl group-containing (meth)acrylic monomer, and about 1.01 mol % to about 10 mol % of the polysiloxane (meth)acrylate.

In one or more embodiments, the second (meth)acrylic binder may be present in an amount of less than about 10 parts by weight relative to 100 parts by weight of the first (meth)acrylic binder.

In one or more embodiments, the first (meth)acrylic binder may have a glass transition temperature of about −35° C. or higher.

In one or more embodiments, the composition may further include a heat curing agent.

Another aspect of one or more embodiments of the present invention relates to an optical member.

The optical member includes an adhesive protective film according to an embodiment of the present invention.

A further aspect of one or more embodiments of the present invention relates to an optical display.

The optical display includes an adhesive protective film according to an embodiment of the present invention.

According to an aspect of embodiments of the present invention, an adhesive protective film that can be easily removed from an optical member after being adhesively bonded to the optical member and can be secured to the optical member through a process (e.g., a predetermined process) is provided.

According to another aspect of embodiments of the present invention, an adhesive protective film that can reduce decrease in peel strength at high temperature relative to peel strength at room temperature while having high peel strength at high temperature is provided.

According to another aspect of embodiments of the present invention, an adhesive protective film that can increase durability of an optical member when secured to the optical member is provided.

According to another aspect of embodiments of the present invention, an adhesive protective film that has a low haze level is provided.

According to another aspect of embodiments of the present invention, an adhesive protective film that has good anti-scattering properties through reduction in particle scattering during a cutting process is provided.

DETAILED DESCRIPTION

Figure 1A:
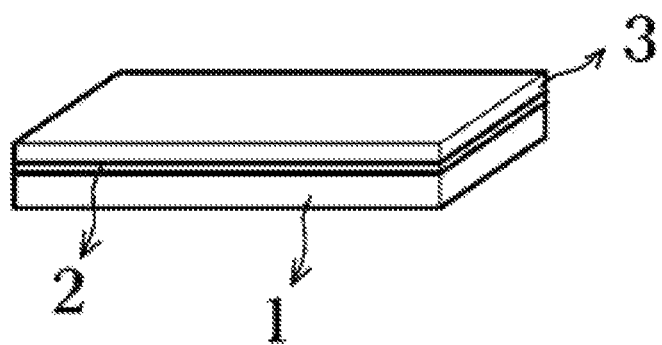
FIG. 1A is view of a specimen for measurement of T-peel peel strength.

Herein, some embodiments of the present invention will be described in further detail. However, it is to be understood that the present invention is not limited to the following embodiments and may be embodied in different ways. In addition, it is to be understood that the embodiments are provided for complete disclosure and thorough understanding of the present invention and so as to fully convey the spirit of the present invention to those skilled in the art to which the present invention pertains. In addition, portions irrelevant to the description may be omitted for clarity.

As used herein, "(meth)acrylic" refers to acrylic and/or methacrylic.

As used herein, "weight average molecular weight" refers to a value measured on a (meth)acrylic copolymer based on polystyrene conversion in gel permeation chromatography (GPC).

As used herein, the term "adherend" includes a glass plate, a plastic film, such as a polyimide film, an acrylic film, and a polyethylene terephthalate (PET) film.

As used herein to represent a specific numerical range, the expression "X to Y" means "greater than or equal to X and less than or equal to Y (X≤ and ≤Y)."

According to an aspect of embodiments of the present invention, an adhesive protective film that can be easily removed from an optical member after being adhesively bonded to the optical member and can be secured to the optical member through a process (e.g., a predetermined process) is provided. According to another aspect of embodiments of the present invention, an adhesive protective film that can reduce decrease in peel strength at high temperature relative to peel strength at room temperature while having high peel strength at high temperature is provided. According to another aspect of embodiments of the present invention, an adhesive protective film that can increase durability of an optical member when secured to the optical member and has a low haze level and good anti-scattering properties is provided.

Herein, an adhesive protective film according to an embodiment of the present invention will be described in further detail.

An adhesive protective film according to an embodiment has an initial peel strength of about 100 gf/inch or less. Within this range, the adhesive protective film can be easily removed from an adherend when there is a need to completely or partially remove the adhesive protective film from the adherend due to the presence of foreign matter on the adherend or misalignment between the adhesive protective film and the adherend after adhesively bonding the adhesive protective film to the adherend.

In an embodiment, the adhesive protective film has an initial peel strength of greater than about 0 gf/inch to about 100 gf/inch, for example, about 1 gf/inch to about 100 gf/inch, about 10 gf/inch to about 100 gf/inch, and, in an embodiment, about 10 gf/inch, about 20 gf/inch, about 30 gf/inch, about 40 gf/inch, about 50 gf/inch, about 60 gf/inch, about 70 gf/inch, about 80 gf/inch, about 90 gf/inch, or about 100 gf/inch. Here, the "initial peel strength" refers to a T-peel strength of the adhesive protective film, as measured through a process in which the adhesive protective film and a polyimide film are sequentially laminated on a polyethylene terephthalate film at a temperature of 23° C. to 25° C. to prepare a specimen, followed by peeling the polyimide film off of the adhesive protective film in the specimen under conditions of a temperature of 23° C. to 25° C., a peeling angle of 180°, and a peeling rate of 2,400 mm/min. Measurement of the T-peel peel strength may be performed with reference to FIGS. 1A and 1B. Further details thereof are provided with reference to experimental examples described below.

The adhesive protective film may be secured to an adherend by heating after being adhesively bonded to the adherend. In an embodiment, the adhesive protective film may have a peel strength decrease rate of about 50% or less, as calculated according to Equation 1. Within this range, the adhesive protective film can have high peel strength with respect to an adherend at high temperatures after being secured to the adherend by heating.

In an embodiment, the adhesive protective film has a peel strength decrease rate of about 0.1% to about 50%, as calculated according to the following Equation 1:

$$\text{Peel strength decrease rate} = [|\text{peel strength at high temperature} - \text{post-heating peel strength}|/\text{post-heating peel strength}] \times 100, \quad \text{Equation 1}$$

where, in Equation 1 the post-heating peel strength is a peel strength (unit: gf/inch) of the adhesive protective film, as measured at 25° C. after leaving a specimen prepared by adhesively bonding the adhesive protective film to an adherend at 50° C. for 1,000 seconds and at 25° C. for 30 minutes, and the peel strength at high temperature is a peel strength (unit: gf/inch) of the adhesive protective film, as measured at 85° C. after leaving a specimen prepared by adhesively bonding the adhesive protective film to an adherend at 85° C. for 60 minutes.

In an embodiment, the adhesive protective film may have a peel strength decrease rate of about 0.1%, about 0.5%, about 1%, about 2%, about 3%, about 4%, about 5%, about 6%, about 7%, about 8%, about 9%, about 10%, about 15%, about 20%, about 25%, about 30%, about 35%, about 40%, about 45%, or about 50%, as calculated according to Equation 1.

Here, "post-heating peel strength" refers to a T-peel strength of the adhesive protective film, as measured through a process in which the adhesive protective film and a polyimide film are sequentially laminated on a polyethylene terephthalate film at a temperature of 23° C. to 25° C. to prepare a specimen, followed by leaving the specimen at 50° C. for 1,000 seconds and 25° C. for 30 minutes, and then the polyimide film is peeled off of the adhesive protective film under conditions of a temperature of 25° C., a peeling angle of 180°, and a peeling rate of 300 mm/min.

In an embodiment, the post-heating peel strength in Equation 1 may have a value of about 500 gf/inch or more, for example, about 500 gf/inch to about 1,000 gf/inch, and, in an embodiment, about 500 gf/inch, about 550 gf/inch, about 600 gf/inch, about 650 gf/inch, about 700 gf/inch, about 750 gf/inch, about 800 gf/inch, about 850 gf/inch, about 900 gf/inch, about 950 gf/inch, or about 1,000 gf/inch. Within this range, the adhesive protective film can be properly secured to an adherend.

In addition, "peel strength at high temperature" refers to a T-peel peel strength of the adhesive protective film, as measured through the following process: First, the adhesive protective film and a polyimide film are sequentially laminated on a polyethylene terephthalate film at a temperature of 23° C. to 25° C., thereby preparing a specimen. The prepared specimen is placed in an autoclave at 50° C. and 5 atm for 1,000 seconds. Then, the specimen is taken out of the autoclave, followed by leaving the specimen at 25° C. for 30 minutes, and then the specimen is retained in a hot chamber at 85° C. for 60 minutes, followed by peeling the polyimide film off of the adhesive protective film in the specimen in the same hot chamber under conditions of a temperature of 85° C., a peeling angle of 180°, and a peeling rate of 300 mm/min. Here, the T-peel peel strength is in-situ peel strength since the measurement is made inside the hot chamber retaining the specimen.

In an embodiment, the peel strength at high temperature in Equation 1 may have a value of about 400 gf/inch or more, for example, about 400 gf/inch to about 800 gf/inch. Within this range, the adhesive protective film can have a peel strength decrease rate of about 50% or less, as calculated according to Equation 1 and can improve durability of an adherend at high temperature. In an embodiment, the peel strength at high temperature in Equation 1 may have a value of about 400 gf/inch, about 450 gf/inch, about 500 gf/inch, about 550 gf/inch, about 600 gf/inch, about 650 gf/inch, about 750 gf/inch, or about 800 gf/inch.

In an embodiment, the adhesive protective film may have an acid value of greater than about 0 mgKOH/g to about 15 mgKOH/g, and, in an embodiment, about 1 mgKOH/g to about 15 mgKOH/g, or about 5 mgKOH/g to about 12 mgKOH/g. Within this range, the adhesive protective film can have a peel strength decrease rate of about 50% or less, as calculated according to Equation 1, through increase in peel strength with change in temperature. In an embodiment, the adhesive protective film may have an acid value of about 1 mgKOH/g, about 2 mgKOH/g, about 3 mgKOH/g, about 4 mgKOH/g, about 5 mgKOH/g, about 6 mgKOH/g, about 7 mgKOH/g, about 8 mgKOH/g, about 9 mgKOH/g, about 10 mgKOH/g, about 11 mgKOH/g, about 12 mgKOH/g, about 13 mgKOH/g, about 14 mgKOH/g, or about 15 mgKOH/g.

In an embodiment, the adhesive protective film may have a glass transition temperature of about −35° C. to about −10° C., and, in an embodiment, about −30° C. to about −15° C. Within this range, the adhesive protective film can have low initial peel strength (100 gf/inch or less).

In an embodiment, the adhesive protective film may have a haze of about 2% or less, for example, greater than about 0% to about 1%, as measured at a wavelength of 300 nm to 800 nm. Within this range, the adhesive protective film can be used as a protective film for an adherend when secured to the adherend.

In an embodiment, the adhesive protective film may have a thickness of about 10 μm to about 100 μm, for example, about 10 μm to about 50 μm. Within this range, the adhesive protective film can be used as a protective film for an adherend.

The adhesive protective film may be formed of a composition including a (meth)acrylic binder derived from a monomer mixture including: an alkyl group-containing (meth)acrylic monomer; and at least one selected from among a hydroxyl group-containing (meth)acrylic monomer, a carboxyl group-containing (meth)acrylic monomer, and a polysiloxane (meth)acrylate.

In an embodiment, the composition may include a (meth)acrylic binder derived from the monomer mixture including the carboxyl group-containing (meth)acrylic monomer. In another embodiment, the composition may include a (meth)acrylic binder derived from the monomer mixture including the polysiloxane (meth)acrylate.

In an embodiment, the alkyl group-containing (meth)acrylic monomer may be present in an amount of about 50 mol % to about 98 mol %, for example, about 55 mol % to about 98 mol %, and, in an embodiment, about 70 mol % to about 90 mol %, in the (meth)acrylic binder. Within this range, the adhesive protective film can have low initial peel strength or high post-heating peel strength.

In an embodiment, the hydroxyl group-containing (meth)acrylic monomer may be present in an amount of about 0.01 mol % to about 45 mol %, for example, about 0.05 mol % to about 45 mol % or about 0.05 mol % to about 35 mol %, and, in an embodiment, about 1 mol % to about 30 mol %, and, in an embodiment, about 3 mol % to about 10 mol %, in the (meth)acrylic binder. Within this range, the hydroxyl group-containing (meth)acrylic monomer can increase peel strength of the adhesive protective film through reaction with a curing agent.

In an embodiment, the carboxyl group-containing (meth)acrylic monomer may be present in an amount of about 0.1 mol % to about 5 mol %, and, in an embodiment, about 0.5 mol % to about 3 mol %, in the (meth)acrylic binder. Within this range, the adhesive protective film can have a peel strength decrease rate of about 50% or less, as calculated according to Equation 1, through increase in peel strength with change in temperature.

In an embodiment, the polysiloxane (meth)acrylate may be present in an amount of about 0.001 mol % to about 1 mol %, and, in an embodiment, about 0.005 mol % to about 0.5 mol %, in the (meth)acrylic binder. Within this range, the adhesive protective film can have low initial peel strength.

The alkyl group-containing (meth)acrylic monomer may include at least one selected from among a $C_1$ to $C_{15}$ linear or branched alkyl group-containing (meth)acrylic monomer and a $C_{16}$ to $C_{22}$ linear or branched alkyl group-containing (meth)acrylic monomer.

The $C_1$ to $C_{15}$ linear or branched alkyl group-containing (meth)acrylic monomer is a $C_1$ to $C_{15}$ linear or branched alkyl group-containing (meth)acrylic acid ester, and may include, for example, at least one selected from among methyl (meth)acrylate, ethyl (meth)acrylate, n-propyl (meth)acrylate, isopropyl (meth)acrylate, n-butyl (meth)acrylate, t-butyl (meth)acrylate, isobutyl (meth)acrylate, pentyl (meth)acrylate, hexyl (meth)acrylate, heptyl (meth)acrylate, octyl (meth)acrylate, isooctyl (meth)acrylate, 2-ethylhexyl (meth)acrylate, and lauryl (meth)acrylate. These $C_1$ to $C_{15}$ linear or branched alkyl group-containing (meth)acrylic monomers may be used alone or in combination thereof in the monomer mixture.

In an embodiment, the $C_1$ to $C_{15}$ linear or branched alkyl group-containing (meth)acrylic monomer may be present in an amount of about 50 mol % to about 98 mol %, and, in an embodiment, about 75 mol % to about 90 mol %, in the (meth)acrylic binder. Within this range, the adhesive protective film can have low peel strength or high post-heating peel strength.

The $C_{16}$ to $C_{22}$ linear or branched alkyl group-containing (meth)acrylic monomer is a $C_{16}$ to $C_{22}$ linear or branched alkyl group-containing (meth)acrylic acid ester, and may include, for example, at least one selected from among stearyl (meth)acrylate and cetyl (meth)acrylate. These $C_{16}$ to $C_{22}$ linear or branched alkyl group-containing (meth)acrylic monomers may be used alone or in combination thereof in the monomer mixture.

In an embodiment, the $C_{16}$ to $C_{22}$ linear or branched alkyl group-containing (meth)acrylic monomer may be present in an amount of about 0.5 mol % to about 10 mol %, and, in an embodiment, about 0.8 mol % to about 5 mol %, in the (meth)acrylic binder. Within this range, the adhesive protective film can have low peel strength.

The hydroxyl group-containing (meth)acrylic monomer increases peel strength of the adhesive protective film through reaction with a curing agent. The hydroxyl group-containing (meth)acrylic monomer may include (meth)acrylic acid esters having a $C_1$ to $C_{20}$ alkyl group having at least one hydroxyl group. For example, the hydroxyl group-containing (meth)acrylic monomer may include at least one selected from among 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth)acrylate, and 1-chloro-2-hydroxypropyl (meth)acrylate. These hydroxyl group-containing (meth)acrylic monomers may be used alone or as a mixture thereof in the monomer mixture.

The carboxyl group-containing (meth)acrylic monomer may include (meth)acrylic acids and the like.

The polysiloxane (meth)acrylate may include at least one selected from among a monofunctional (meth)acrylate having multiple polysiloxane units and a polyfunctional (meth)acrylate having multiple polysiloxane units. In an embodiment, the polyfunctional (meth)acrylate having multiple polysiloxane units includes a bifunctional (meth)acrylate having multiple polysiloxane units. In an embodiment, the polysiloxane unit includes a polydialkylsiloxane unit.

In an embodiment, the polysiloxane (meth)acrylate may include a compound represented by the following Formula 1:

Formula 1

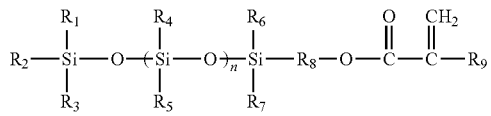

where, in Formula 1, $R_1$, $R_2$, $R_3$, $R_4$, $R_5$, $R_6$, and $R_7$ are each independently hydrogen, a $C_1$ to $C_{10}$ alkyl group, a $C_3$ to $C_{10}$ cycloalkyl group, or a $C_6$ to $C_{10}$ aryl group; $R_8$ is a $C_1$ to $C_{10}$ alkylene group, a $C_6$ to $C_{10}$ arylene group, or a $C_1$ to $C_{10}$ alkyleneoxy group; $R_9$ is hydrogen or a methyl group; and n is an integer from 1 to 100.

The aforementioned polysiloxane (meth)acrylates may be used alone or in combination thereof in the monomer mixture.

The monomer mixture may further include an amide group-containing monomer.

The amide group-containing monomer serves to improve reliability of the adhesive protective film through control over peel strength of the adhesive protective film.

The amide group-containing monomer may include at least one selected from among (meth)acryl amide, N-vinyl pyrrolidone, and (meth)acryloyl morpholine. In an embodiment, the amide group-containing monomer includes N-vinyl pyrrolidone, which is a pyrrolidonyl group-containing monomer.

In an embodiment, the amide group-containing monomer may be optionally present in an amount of about 20 mol % or less, for example, about 0.1 mol % to about 20 mol %, and, in an embodiment, about 1 mol % to about 5 mol %, in the (meth)acrylic binder. Within this range, the amide group-containing monomer can improve reliability of the adhesive protective film through control over peel strength of the adhesive protective film.

The monomer mixture may further include at least one selected from among benzyl (meth)acrylate and vinyl acetate.

The composition may further include a curing agent. In an embodiment, the curing agent may be present in an amount of about 0.01 parts by weight to about 5 parts by weight, and, in an embodiment, about 0.1 parts by weight to about 3 parts by weight, relative to 100 parts by weight of the (meth)acrylic binder. Within this range, the curing agent can secure adhesion of the composition by inducing crosslinking between the components of the composition while preventing or substantially preventing deterioration in transparency of the adhesive protective film due to excessive use of the curing agent.

The composition may further include at least one selected from among a curing catalyst, a solvent, a silane coupling agent, and a reworkability improver.

In an embodiment, the adhesive protective film may be formed of a composition including a mixture of a first (meth)acrylic binder and a second (meth)acrylic binder, wherein the first (meth)acrylic binder is derived from a monomer mixture including the alkyl group-containing (meth)acrylic monomer, the hydroxyl group-containing (meth)acrylic monomer, and the carboxyl group-containing (meth)acrylic monomer and the second (meth)acrylic binder is derived from a monomer mixture including the alkyl group-containing (meth)acrylic monomer and the polysiloxane (meth)acrylate.

First (meth)acrylic Binder

The first (meth)acrylic binder is a (meth)acrylic binder derived from the monomer mixture including the alkyl group-containing (meth)acrylic monomer, the hydroxyl group-containing (meth)acrylic monomer, and the carboxyl group-containing (meth)acrylic monomer. The first (meth)acrylic binder essentially includes a unit derived from the carboxyl group-containing (meth)acrylic monomer. In this way, the adhesive protective film can have a peel strength decrease rate of about 50% or less, as calculated according to Equation 1, through reduction in decrease in peel strength at high temperature relative to peel strength at room temperature.

In an embodiment, the carboxyl group-containing (meth)acrylic monomer may be present in an amount of about 1 mol % to about 13 mol % in the monomer mixture for the first (meth)acrylic binder. Within this range, the adhesive protective film can have a peel strength decrease rate of about 50% or less, as calculated according to Equation 1, through reduction in decrease in peel strength at high temperature relative to peel strength at room temperature and through increase in peel strength with change in temperature.

In an embodiment, the first (meth)acrylic binder may have an acid value of greater than about 0 mgKOH/g to about 15 mgKOH/g, and, in an embodiment, about 5 mgKOH/g to about 12 mgKOH/g. Within this range, the adhesive protective film can have a peel strength decrease rate of about 50% or less, as calculated according to Equation 1, through increase in peel strength with change in temperature.

In an embodiment, the first (meth)acrylic binder may have a glass transition temperature of about −35° C. or higher, and, in an embodiment, about −30° C. to about −15° C. Within this range, it is possible to make it easy for the adhesive protective film to have a peel strength decrease rate of about 50% or less, as calculated according to Equation 1, and a post-heating peel strength falling within the range set forth herein.

In an embodiment, the first (meth)acrylic binder may have a weight average molecular weight of about 500,000 to about 1,000,000, for example, about 600,000 to about 700,000. Within this range, the first (meth)acrylic binder can provide good reliability and wettability to the composition.

Details of the alkyl group-containing (meth)acrylic monomer may be the same as described above. In one embodiment, the $C_1$ to $C_{15}$ linear or branched alkyl group-containing (meth)acrylic monomer described above may be used as the alkyl group-containing (meth)acrylic monomer. According this embodiment, it is possible to facilitate achievement of the desired effects of the present invention.

In one embodiment, the $C_1$ to $C_{15}$ linear or branched alkyl group-containing (meth)acrylic monomer may include a mixture of (meth)acrylic monomers having different homopolymer glass transition temperatures. According to this embodiment, it is possible to make it easy for the adhesive protective film to have a peel strength decrease rate of about 50% or less, as calculated according to Equation 1.

In an embodiment, the monomer mixture for the first (meth)acrylic binder may include a mixture of a first alkyl group-containing (meth)acrylic monomer having a homopolymer glass transition temperature of about −80° C. to about 0° C., and, in an embodiment, about −80° C. to about −20° C. or about −60° C. to about −20° C. and a second alkyl group-containing (meth)acrylic monomer having a homopolymer glass transition temperature of higher than about 0° C. to about 50° C.

The first alkyl group-containing (meth)acrylic monomer may include at least one selected from among ethyl acrylate, 2-ethylhexyl acrylate, n-butyl acrylate, and lauryl acrylate. The second alkyl group-containing (meth)acrylic monomer may include at least one selected from among methyl acrylate, tert-butyl acrylate, and isobutyl methacrylate.

In an embodiment, the second alkyl group-containing (meth)acrylic monomer having a homopolymer glass transition temperature of higher than about 0° C. to about 50° C. may be present in an amount more than or equal to that of the first alkyl group-containing (meth)acrylic monomer having a homopolymer glass transition temperature of about −80° C. to about 0° C., in the monomer mixture for the first (meth)acrylic binder.

For example, the second alkyl group-containing (meth)acrylic monomer having a homopolymer glass transition temperature of higher than about 0° C. to about 50° C. may be present in an amount of about 50 mol % to about 99 mol %, and, in an embodiment, about 50 mol % to about 80 mol %, in the monomer mixture for the first (meth)acrylic binder. Within this range, the adhesive protective film can have low initial peel strength (about 100 gf/inch or less).

In an embodiment, the first alkyl group-containing (meth)acrylic monomer having a homopolymer glass transition temperature of about −80° C. to about 0° C. may be present in an amount of about 1 mol % to about 50 mol %, and, in an embodiment, about 20 mol % to about 50 mol %, in the monomer mixture for the first (meth)acrylic binder. Within this range, the adhesive protective film can have low initial peel strength (about 100 gf/inch or less).

In an embodiment, the $C_1$ to $C_{15}$ linear or branched alkyl group-containing (meth)acrylic monomer may be present in an amount of about 60 mol % to about 98 mol %, and, in an embodiment, about 60 mol % to about 95 mol %, about 65 mol % to about 95 mol %, about 70 mol % to about 95 mol %, about 75 mol % to about 95 mol %, about 80 mol % to about 95 mol %, or about 87 mol % to about 95 mol %, in the monomer mixture for the first (meth)acrylic binder. Within this range, the adhesive protective film can have low initial peel strength or high post-heating peel strength.

Details of the hydroxyl group-containing (meth)acrylic monomer may be the same as described above.

In an embodiment, the hydroxyl group-containing (meth)acrylic monomer may be present in an amount of about 0.1 mol % to about 35 mol %, for example, about 0.5 mol % to about 35 mol %, about 1 mol % to about 35 mol %, about 1 mol % to about 30 mol %, about 1 mol % to about 25 mol %, about 1 mol % to about 20 mol %, about 1 mol % to about 15 mol %, or about 1 mol % to about 10 mol %, in the monomer mixture for the first (meth)acrylic binder. Within this range, the adhesive protective film can have a desired level of peel strength without deterioration in mechanical strength.

Details of the carboxyl group-containing (meth)acrylic monomer may be the same as described above.

In an embodiment, the carboxyl group-containing (meth)acrylic monomer may be present in an amount of about 1 mol % to about 13 mol %, and, in an embodiment, about 1 mol % to about 5 mol %, about 1.5 mol % to about 5 mol %, about 1.5 mol % to about 4 mol %, or about 1.5 mol % to about 3 mol %, in the monomer mixture for the first (meth)acrylic binder. Within this range, the adhesive protective film can have a peel strength decrease rate of about 50% or less, as calculated according to Equation 1, through reduction in decrease in peel strength at high temperature relative to peel strength at room temperature.

The monomer mixture for the first (meth)acrylic binder may further include an amide group-containing monomer. Details of the amide group-containing monomer may be the same as described above.

In an embodiment, the amide group-containing (meth)acrylic monomer may be optionally present in an amount of about 20 mol % or less, and, in an embodiment, about 1 mol % to about 20 mol % or about 3 mol % to about 10 mol %, in the monomer mixture for the first (meth)acrylic binder. Within this range, the amide group-containing monomer can improve reliability of the adhesive protective film through control over peel strength of the adhesive protective film.

The monomer mixture for the first (meth)acrylic binder may further include at least one selected from among benzyl (meth)acrylate and vinyl acetate.

The first (meth)acrylic binder may be prepared by polymerizing the monomer mixture for the first (meth)acrylic binder. Polymerization of the monomer mixture may be performed by any typical polymerization method known to those skilled in the art. For example, the first (meth)acrylic binder may be prepared by adding a radical initiator to the monomer mixture, followed by polymerizing the monomer mixture by any typical copolymerization method, for example, suspension polymerization, emulsion polymerization, or solution polymerization. In an embodiment, polymerization may be performed at a temperature of about 65° C. to about 70° C. for about 6 to 8 hours. The initiator may include any typical initiator, including, for example, an azo polymerization initiator; and/or a peroxide, such as benzoyl peroxide or acetyl peroxide.

Second (meth)acrylic Binder

The second (meth)acrylic binder serves to reduce initial peel strength of the adhesive protective film.

In an embodiment, the second (meth)acrylic binder may have a melting temperature (Tm) of about 30° C. to about 50° C., and, in an embodiment, about 30° C. to about 40° C. Within this range, peel strength of the adhesive protective film can be increased by heating the composition to a temperature exceeding the melting temperature (Tm) of the second (meth)acrylic binder for a short period of time.

In an embodiment, the second (meth)acrylic binder may have a weight average molecular weight of about 10,000 to about 50,000, and, in an embodiment, about 20,000 to about 35,000. Within this range, the adhesive protective film can have low initial peel strength and high post-heating peel strength.

The second (meth)acrylic binder is a binder derived from the monomer mixture including the alkyl group-containing (meth)acrylic monomer and the polysiloxane (meth)acrylate. In an embodiment, the $C_{16}$ to $C_{22}$ linear or branched alkyl group-containing (meth)acrylic monomer described above may be used as the alkyl group-containing (meth)acrylic monomer. According to this embodiment, it is possible to facilitate achievement of the desired effects of the present invention.

Details of the $C_{16}$ to $C_{22}$ linear or branched alkyl group-containing (meth)acrylic monomer may be the same as described above.

In an embodiment, the $C_{16}$ to $C_{22}$ linear or branched alkyl group-containing (meth)acrylic monomer may be present in an amount exceeding that of the polysiloxane (meth)acrylate in the monomer mixture for the second (meth)acrylic binder. For example, the $C_{16}$ to $C_{22}$ linear or branched alkyl group-containing (meth)acrylic monomer may be present in an amount of about 90 mol % to about 98.99 mol %, and, in an embodiment, about 95 mol % to about 98.5 mol %, in the monomer mixture for the second (meth)acrylic binder. Within this range, the adhesive protective film can have low initial peel strength.

Details of the polysiloxane (meth)acrylate may be the same as described above.

In an embodiment, the polysiloxane (meth)acrylate may be present in an amount of about 1.01 mol % to about 10 mol %, specifically about 1.5 mol % to about 5 mol %, in the monomer mixture for the second (meth)acrylic binder. Within this range, the adhesive protective film can have low initial peel strength.

In an embodiment, in the composition for the adhesive protective film, the second (meth)acrylic binder may be present in an amount of less than about 10 parts by weight, for example, about 0.01 parts by weight to less than about 10 parts by weight, for example, about 0.01 parts by weight to about 5 parts by weight, and, in an embodiment, about 0.01 parts by weight, about 0.05 parts by weight, about 0.1 parts by weight, about 0.5 parts by weight, about 1 part by weight, about 1.5 parts by weight, about 2 parts by weight, about 2.5 parts by weight, about 3 parts by weight, about 3.5 parts by weight, about 4 parts by weight, about 4.5 parts by weight, about 5 parts by weight, about 5.5 parts by weight, about 6 parts by weight, about 6.5 parts by weight, about 7 parts by weight, about 7.5 parts by weight, about 8 parts by weight, about 8.5 parts by weight, about 9 parts by weight, about 9.5 parts by weight, or about 9.9 parts by weight, relative to 100 parts by weight of the first (meth)acrylic binder. Within this range, the adhesive protective film can have low initial peel strength and high post-heating peel strength.

Curing Agent

The composition for the adhesive protective film may further include a curing agent.

The curing agent can provide peel strength through reaction with at least one selected from among the aforementioned (meth)acrylic binders, and, in an embodiment, a mixture of the first (meth)acrylic binder and the second (meth)acrylic binder.

In an embodiment, the curing agent may be present in an amount of about 0.01 parts by weight to about 5 parts by weight, for example, about 0.1 parts by weight to about 2.5 parts by weight, relative to 100 parts by weight of the first (meth)acrylic binder. Within this range, the curing agent can secure adhesion of the composition by inducing crosslinking between the components of the composition while preventing or substantially preventing deterioration in transparency of the adhesive protective film due to excessive use of the curing agent. For example, the curing agent may be present in an amount of about 0.01 parts by weight, 0.02 parts by weight, 0.03 parts by weight, 0.04 parts by weight, 0.05 parts by weight, 0.06 parts by weight, 0.07 parts by weight, 0.08 parts by weight, 0.09 parts by weight, 0.1 parts by weight, 0.2 parts by weight, 0.3 parts by weight, 0.4 parts by weight, 0.5 parts by weight, 0.6 parts by weight, 0.7 parts by weight, 0.8 parts by weight, 0.9 parts by weight, 1 part by weight, 2 parts by weight, 3 parts by weight, 4 parts by weight, or 5 parts by weight, relative to 100 parts by weight of the first (meth)acrylic binder.

The curing agent is a heat curing agent and may include at least one selected from among an isocyanate curing agent, a metal chelate curing agent, an epoxy curing agent, an aziridine curing agent, an amine curing agent, and a thermal polymerization initiator. For example, the curing agent may include an isocyanate curing agent.

The isocyanate curing agent is a bi- or higher-functional, for example, hexafunctional, isocyanate curing agent, and may include at least one selected from among xylene diisocyanate (XDI), such as m-xylene diisocyanate, methylenebis(phenyl isocyanate) (MDI), such as 4,4'-methylenebis(phenyl isocyanate), naphthalene diisocyanate, tolylene diisocyanate, and hexamethylene diisocyanate, or an adduct thereof, for example, an isocyanurate thereof, without being limited thereto.

The metal chelate curing agent may include a coordination compound of a polyvalent metal, such as aluminum. For example, the metal chelate curing agent may include an aluminum chelate compound, such as any of aluminum trisethylacetoacetate, aluminum ethyl acetoacetate diisopropylate, and aluminum trisacetylacetonate.

The thermal polymerization initiator may include at least one selected from among an azo compound, a peroxide compound, and a redox compound. Examples of the peroxide compound may include: inorganic peroxides such as potassium persulfate, ammonium persulfate, or hydrogen peroxide; and organic peroxides such as diacyl peroxide, peroxydicarbonate, peroxyester, tetramethylbutyl peroxyneodecanoate, bis(4-butylcyclohexyl)peroxydicarbonate, di(2-ethylhexyl)peroxycarbonate, butyl peroxyneodecanoate, dipropyl peroxydicarbonate, diisopropyl peroxydicarbonate, diethoxyethyl peroxydicarbonate, diethoxyhexyl peroxydicarbonate, hexyl peroxydicarbonate, dimethoxybutyl peroxydicarbonate, bis(3-methoxy-3-methoxybutyl) peroxydicarbonate, dibutyl peroxydicarbonate, dicetyl peroxydicarbonate, dimyristyl peroxydicarbonate, 1,1,3,3-tetramethylbutyl peroxypivalate, hexyl peroxypivalate, butyl peroxypivalate, trimethylhexanoyl peroxide, dimethyl hydroxybutyl peroxyneodecanoate, amyl peroxyneodecanoate, butyl peroxyneodecanoate, t-butyl peroxyneoheptanoate, amyl peroxypivalate, t-butyl peroxypivalate, t-amyl peroxy-2-ethylhexanoate, lauroyl peroxide, dilauroyl peroxide, didecanoyl peroxide, benzoyl peroxide, or dibenzoyl peroxide.

The composition for the adhesive protective film may further include at least one selected from among a curing catalyst, a solvent, a silane coupling agent, and a reworkability improver.

The curing catalyst may include at least one selected from among: a boron compound, for example, a boron trifluoride complex, and, in an embodiment, an etherate of boron trifluoride, a boron trifluoride-tetrahydrofuran complex ($BF_3$-THF), or a boron trifluoride-aniline complex ($BF_3$-Aniline), and, in an embodiment, boron trifluoride dimethyl etherate ($BF_3 \cdot O(CH_3)_2$), boron trifluoride diethyl etherate ($BF_3 \cdot O(C_2H_5)_2$); a phosphine compound, for example, triphenyl phosphine, tributyl phosphine, tri(p-methyl phenyl) phosphine, tri(nonyl phenyl)phosphine, triphenylphosphine/triphenylborate, or tetraphenyl borate; a secondary or tertiary amine compound, for example, an α-tertiary amine compound (for example, KH-30, Kukdo Chemical), such as triethyl amine, benzyl diethyl amine, and benzyl dimethyl amine; an imidazole compound, for example, 2-methylimidazole, 2-phenylimidazole, or 2-phenyl-4-methylimidazole; and a sulfonic acid compound, for example, p-toluene sulfonic acid, dodecyl benzene sulfonic acid, naphthalene sulfonic acid, naphthalene disulfonic acid, methane sulfonic acid, methane disulfonic acid, or phenol sulfonic acid. In an embodiment, the curing catalyst may be present in an amount of about 0.001 parts by weight to about 5 parts by weight, and, in an embodiment, about 0.001 parts by weight to about 2 parts by weight, relative to 100 parts by weight of the first (meth)acrylic binder. Within this range, the curing catalyst can shorten the time required to cure the composition. For example, the curing catalyst may be present in an amount of about 0.001 parts by weight, 0.005 parts by weight, 0.01 parts by weight, 0.02 parts by weight, 0.03 parts by weight, 0.04 parts by weight, 0.05 parts by weight, 0.06 parts by weight, 0.07 parts by weight, 0.08 parts by weight, 0.09 parts by weight, 0.1 parts by weight, 0.2 parts by weight, 0.3 parts by weight, 0.4 parts by weight, 0.5 parts by weight, 0.6 parts by weight, 0.7 parts by weight, 0.8 parts by weight, 0.9 parts by weight, 1 part by weight, 2 parts by weight, 3 parts by weight, 4 parts by weight, or 5 parts by weight, relative to 100 parts by weight of the first (meth) acrylic binder.

The solvent improves coatability of the composition for the adhesive protective film while preventing or substantially preventing self-curing of the composition. The solvent may include any typical solvent known to those skilled in the art. For example, the solvent may include at least one selected from among methyl ethyl ketone, ethyl acetate, and toluene. The solvent may be present in a balance amount in the composition.

The silane coupling agent allows the adhesive protective film to have high adhesion to an adherend such as glass. The silane coupling agent may include any typical silane coupling agent known to those skilled in the art. For example, the silane coupling agent may include at least one selected from the group consisting of: an epoxylated silicon compound such as 3-glycidoxypropyltrimethoxysilane, 3-glycidoxypropylmethyldimethoxysilane, and 2-(3,4-epoxycyclohexyl)ethyltrimethoxysilane; a polymerizable unsaturated group-containing silicon compound such as vinyl trimethoxysilane, vinyl triethoxysilane, and (meth)acryloxypropyltrimethoxysilane; an amino group-containing silicon compound such as 3-aminopropyltrimethoxysilane, N-(2-aminoethyl)-3-aminopropyltrimethoxysilane, and N-(2-aminoethyl)-3-aminopropylmethyldimethoxysilane; and 3-chloropropyltrimethoxysilane, without being limited thereto. In an embodiment, the silane coupling agent may be present in an amount of about 0.001 parts by weight to about 5 parts by weight, and, in an embodiment, about 0.001 parts by weight to about 3 parts by weight, relative to 100 parts by weight of the first (meth)acrylic binder. Within this range, the silane coupling agent can improve durability of the adhesive protective film while reducing change in composition and property of the adhesive protective film over time. For example, the silane coupling agent may be present in an amount of about 0.001 parts by weight, 0.005 parts by weight, 0.01 parts by weight, 0.02 parts by weight, 0.03 parts by weight, 0.04 parts by weight, 0.05 parts by weight, 0.06 parts by weight, 0.07 parts by weight, 0.08 parts by weight, 0.09 parts by weight, 0.1 parts by weight, 0.2 parts by weight, 0.3 parts by weight, 0.4 parts by weight, 0.5 parts by weight, 0.6 parts by weight, 0.7 parts by weight, 0.8 parts by weight, 0.9 parts by weight, 1 part by weight, 2 parts by weight, 3 parts by weight, 4 parts by weight, or 5 parts by weight, relative to 100 parts by weight of the first (meth) acrylic binder.

The reworkability improver serves to improve reworkability of the adhesive protective film, and may include a polysiloxane oligomer or a mixture including the polysiloxane oligomer. In an embodiment, the reworkability improver may be present in an amount of about 0.001 parts by weight to about 5 parts by weight, and, in an embodiment, about 0.005 parts by weight to about 1 part by weight, relative to 100 parts by weight of the first (meth)acrylic binder. Within this range, the reworkability improver can improve reworkability of the adhesive protective film without affecting the properties of the adhesive protective film. For example, the reworkability improver may be present in an amount of about 0.001 parts by weight, 0.005 parts by weight, 0.01 parts by weight, 0.02 parts by weight, 0.03 parts by weight, 0.04 parts by weight, 0.05 parts by weight, 0.06 parts by weight, 0.07 parts by weight, 0.08 parts by weight, 0.09 parts by weight, 0.1 parts by weight, 0.2 parts by weight, 0.3 parts by weight, 0.4 parts by weight, 0.5 parts by weight, 0.6 parts by weight, 0.7 parts by weight, 0.8 parts by weight, 0.9 parts by weight, 1 part by weight, 2 parts by weight, 3 parts by weight, 4 parts by weight, or 5 parts by weight, relative to 100 parts by weight of the first (meth) acrylic binder.

The composition may further include any typical additive. The additive may include any of an antistatic agent, a UV absorber, an antioxidant, a tackifier resin, a plasticizer, and the like. In an embodiment, the additive may be present in an amount of about 0.001 parts by weight to about 5 parts by weight, and, in an embodiment, about 0.01 parts by weight to about 1 part by weight, relative to 100 parts by weight of the first (meth)acrylic binder. Within this range, the additive can provide desired effects without affecting the properties of the adhesive protective film. For example, the additive may be present in an amount of about 0.001 parts by weight, 0.005 parts by weight, 0.01 parts by weight, 0.02 parts by weight, 0.03 parts by weight, 0.04 parts by weight, 0.05 parts by weight, 0.06 parts by weight, 0.07 parts by weight, 0.08 parts by weight, 0.09 parts by weight, 0.1 parts by weight, 0.2 parts by weight, 0.3 parts by weight, 0.4 parts by weight, 0.5 parts by weight, 0.6 parts by weight, 0.7 parts by weight, 0.8 parts by weight, 0.9 parts by weight, 1 part by weight, 2 parts by weight, 3 parts by weight, 4 parts by weight, or 5 parts by weight, relative to 100 parts by weight of the first (meth)acrylic binder.

In an embodiment, the composition may have a viscosity of about 1,000 cP to about 4,000 cP at 25° C. Within this range, the composition allows easy adjustment of the thickness of the adhesive protective film, can prevent or substantially prevent stain on the adhesive protective film, and can provide a uniform or substantially uniform coating surface.

The adhesive protective film may be fabricated by coating the composition for the adhesive protective film on a release film to a thickness (e.g., a predetermined thickness), followed by drying of the solvent and aging. Here, drying of the solvent and aging may be carried out under typical conditions known to those skilled in the art.

In an embodiment, the adhesive protective film may be fabricated through a process in which the composition is coated onto a release film to a thickness (e.g., a predetermined thickness) to form a coating layer, followed by drying the coating layer at about 80° C. to about 100° C. for about 1 to 10 minutes, and then the dried coating layer is subjected to aging at about 30° C. to about 60° C. for about 1 to 3 days.

Next, an optical member according to an embodiment of the present invention will be described.

The optical member may include a device for optical displays and an adhesive protective film laminated on the device, wherein the adhesive protective film may include an adhesive protective film according to the present invention. The device may include a device including a glass plate or a plastic film, such as a polyimide film. For example, the device may include an organic light emitting diode panel, without being limited thereto.

In an embodiment, the optical member may be fabricated by laminating an adhesive protective film according to the present invention on the device, followed by heating to a temperature of about 40° C. to about 60° C. at a high pressure of about 2 atm to about 5 atm, without being limited thereto.

Next, an optical display according to an embodiment of the present invention will be described.

The optical display may include an adhesive protective film or an optical member according to an embodiment of the present invention. In an embodiment, the optical display may include a light emitting display, such as a liquid crystal display or an organic light emitting display.

Next, the present invention will be described in further detail with reference to some examples. However, it should be noted that these examples are provided for illustration only and should not be construed in any way as limiting the invention.

Preparative Example A1: Preparation of (meth)acrylic Binder

A monomer mixture including 38 mol % of 2-ethylhexyl acrylate (2-EHA), 50 mol % of methyl acrylate (MA), 5 mol % of N-vinylpyrrolidone (NVP), 2 mol % of acrylic acid (AA), and 5 mol % of 4-hydroxybutyl acrylate (4-HBA) and toluene were introduced into a 1,000 ml reactor, followed by stirring for 30 minutes while purging the reactor with nitrogen. After setting the internal temperature of the reactor to 60° C., a radical initiator (V-601, Wako Chemicals) was added in an amount of 0.04 parts by weight relative to 100 parts by weight of the monomer mixture. After reaction in the reactor at 60° C. for 4 hours, the internal temperature of the reactor was raised to 70° C., followed by further adding 0.1 parts by weight of the radical initiator (V-601, Wako Chemicals). Then, a (meth)acrylic binder solution was obtained through reaction at 70° C. for 2 hours. Then, the obtained (meth)acrylic binder solution was cooled to room temperature. Then, the number average molecular weight (Mn), weight average molecular weight (Mw), and polydispersity index (PDI, Mw/Mn) of the (meth)acrylic binder were measured by GPC and the glass transition temperature (Tg, unit: ° C.) of the (meth)acrylic binder was measured by DSC.

Preparative Examples A2 to A5: Preparation of (meth)acrylic Binder (Meth)acrylic binders were prepared in the same manner as in Preparative Example A1 except that the kinds and/or amounts of monomers included in the monomer mixture were changed as listed in Table 1 and the amount of the radical initiator, the amount of toluene, the polymerization temperature, and/or the polymerization time were changed. In Table 1, "-" means that a corresponding component was not used.

TABLE 1

| | Monomer | | | | | | | | |
|---|---|---|---|---|---|---|---|---|---|
| | 2-EHA | MA | NVP | AA | 4-HBA | Mn | Mw | PDI | Tg |
| Preparative Example A1 | 38 | 50 | 5 | 2 | 5 | 122,873 | 625,547 | 5.1 | −29.6 |
| Preparative Example A2 | 33 | 55 | 5 | 2 | 5 | 144,219 | 647,477 | 4.5 | −24.9 |
| Preparative Example A3 | 28 | 60 | 5 | 2 | 5 | 139,587 | 673,707 | 4.8 | −18.4 |
| Preparative Example A4 | 28 | 65 | — | 2 | 5 | 121,972 | 626,231 | 5.1 | −18.7 |
| Preparative Example A5 | 28 | 67 | — | — | 5 | 139,587 | 673,707 | 4.8 | −19.8 |

Preparative Example B1: Preparation of (meth)acrylic Binder

A monomer mixture including 98.5 mol % of stearyl methacrylate (STMA) and 1.5 mol % of a silicon-containing monofunctional (meth)acrylate (KF-2012, ShinEtsu Chemicals, polydimethylsiloxane unit-containing monofunctional (meth)acrylate) and toluene were introduced into a 250 ml reactor, followed by stirring for 30 minutes while purging the reactor with nitrogen. After setting the internal temperature of the reactor to 70° C., a radical initiator (V-601, Wako Chemicals) was added in an amount of 0.2 parts by weight relative to 100 parts by weight of the monomer mixture. Then, reaction was conducted for 4 hours while maintaining the internal temperature of the reactor at 70° C. Then, the internal temperature of the reactor was raised to 77° C., followed by reaction at 77° C. for 2 hours, thereby obtaining a (meth)acrylic binder solution. Then, the obtained (meth)acrylic binder solution was cooled to room temperature. Then, the Mn, Mw, and PDI of the (meth)acrylic binder were measured by GPC and the melting temperature (Tm, unit: ° C.) of the (meth)acrylic binder was measured by DSC.

Preparative Examples B2 to B5: Preparation of (meth)acrylic Binder (Meth)acrylic binders were prepared in the same manner as in Preparative Example B1 except that the kinds and/or amounts of monomers included in the monomer mixture were changed as listed in Table 2 and the amount of the radical initiator, the amount of toluene, the polymerization temperature, and/or the polymerization time were changed.

TABLE 2

| | Monomer | | | | | |
|---|---|---|---|---|---|---|
| | STMA | KF-2012 | Mn | Mw | PDI | Tm |
| Preparative Example B1 | 98.5 | 1.5 | 16,420 | 30,335 | 1.8 | 36.2 |
| Preparative Example B2 | 98 | 2 | 16,225 | 29,451 | 1.8 | 35.8 |
| Preparative Example B3 | 97 | 3 | 13,312 | 24,213 | 1.8 | 36.0 |
| Preparative Example B4 | 96 | 4 | 13,288 | 24,684 | 1.9 | 35.9 |
| Preparative Example B5 | 95 | 5 | 14,119 | 27,019 | 1.9 | 35.2 |

Details of the components used in Examples and Comparative Examples were as follows:

(A) (Meth)acrylic binder: Preparative Example A1 to Preparative Example A5 and Preparative Example B1 to Preparative Example B5

(B) Curing agent: Hexamethylene diisocyanurate (Coronate HX, Tosoh Corp.)

(C) Curing catalyst: Accelerator S (Soken Chemical & Engineering Co., Ltd.)

EXAMPLE 1

On a solid basis, 100 parts by weight of the (meth)acrylic binder prepared in Preparative Example A2 was mixed with 2.5 parts by weight of the (meth)acrylic binder prepared in Preparative Example B1, 0.125 parts by weight of the curing agent, and 0.0033 parts by weight of the curing catalyst, and then 20 parts by weight of methyl ethyl ketone was added to the mixture, followed by stirring at 25° C. for 5 minutes, thereby preparing an adhesive protective film composition.

The prepared adhesive protective film composition was coated onto a polyethylene terephthalate (PET) film (TU73A, thickness: 75 μm) to a predetermined thickness and dried in an oven at 90° C. for 4 minutes, thereby forming a 13 μm thick coating layer. Then, the coating layer was covered with a PET release film, followed by aging at 50° C. for 2 days, and then the resultant was left at room temperature, thereby fabricating a laminate in which the PET film, an adhesive protective film (thickness: 13 μm), and the release PET film were sequentially stacked from bottom to top.

EXAMPLES 2 TO 10 AND COMPARATIVE EXAMPLE 1

A laminate in which a PET film, an adhesive protective film (thickness: 13 μm), and a release PET film were sequentially stacked from bottom to top was fabricated in the same manner as in Example 1 except that the composition of the adhesive protective film composition was changed as listed in Table 3. In Table 3, "-" means that a corresponding component was not used.

Each of the laminates fabricated in Examples 1 to 10 and Comparative Example 1 was evaluated as to the physical properties listed in Table 3. Results are shown in Table 3.

(1) Haze (unit: %): The release PET film was peeled off of each of the laminates, thereby obtaining the adhesive protective film. Haze of the obtained adhesive protective film was measured using a haze meter (NDH 2000, Nippon Denshoku Industries Co., Ltd.).

Figure 1B:
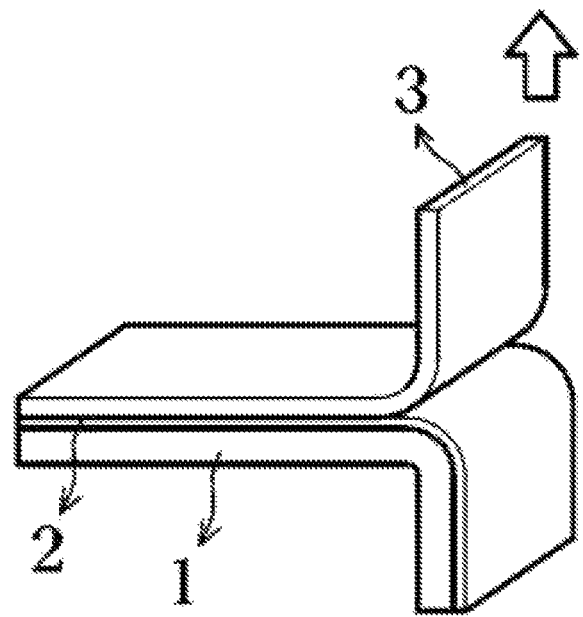
FIG. 1B is a view illustrating a T-peel strength measurement operation for the specimen.

(2) Initial peel strength (unit: gf/inch): One release film was removed from each of the laminates to expose the adhesive protective film, which, in turn, was stacked on a polyimide film (GF200, SKC-Kolon PI Co. thickness: 38 μm), followed by lamination using a roll laminator. Then, the resultant was cut to a size of 25 mm×100 mm (width× length), thereby preparing a specimen. FIG. 1A shows the prepared specimen. Referring to FIG. 1A, the prepared specimen had a structure in which a release PET film 1, an adhesive protective film 2, and a polyimide film 3 were sequentially stacked from bottom to top.

The prepared specimen was mounted on a TA Instrument (texture analyzer TA.XT plus, 5 kg load cell, EKO Instruments), followed by measurement of T-peel strength under conditions of a peeling rate of 2,400 mm/min, a peeling angle of 180°, and a temperature of 25° C. Measurement of T-peel strength was conducted with reference to FIG. 1B. Here, the T-peel strength refers to a peel strength measured by peeling the polyimide film 3 off of the release PET film 1 and the adhesive protective film 2. In measurement of the T-peel strength, the polyimide film 3 may be pulled in the direction indicated by the arrow of FIG. 1B with the release PET film 1 and the adhesive protective film 2 clamped to a jig of the TA Instrument.

(3) Post-heating peel strength (unit: gf/inch): A specimen was prepared in the same manner as in (2).

The prepared specimen was left in an autoclave at 50° C. and 5 atm for 1,000 seconds and then left at 25° C. for 30 minutes.

The treated specimen was mounted on a TA instrument (texture analyzer TA.XT plus, 5 kg load cell, EKO Instruments), followed by measurement of T-peel strength in the same manner as in (2) under conditions of a peeling rate of 300 mm/min, a peeling angle of 180°, and a temperature of 25° C. The measurement was repeated three times to obtain an average.

(4) Peel strength at high temperature (unit: gf/inch): A specimen was prepared in the same manner as in (2).

The prepared specimen was left in an autoclave at 50° C. and 5 atm for 1,000 seconds and then left at room temperature for 30 minutes. Then, the specimen was left in a hot chamber (internal temperature: 85° C.) for 60 minutes. Then, the specimen was mounted on a TA instrument (texture analyzer TA.XT plus, 5 kg load cell, EKO Instruments) in the hot chamber, followed by measurement of T-peel strength in the same manner as in (2) under conditions of a peeling rate of 300 mm/min, a peeling angle of 180°, and a temperature of 85° C. The measurement was repeated three times to obtain an average.

(5) Acid value of adhesive protective film (unit: mgKOH/g): After removing both PET films from each of the laminates fabricated in Examples 1 to 10 and Comparative Example 1, followed by sampling 1 g of the adhesive protective film. The adhesive protective film sample was pulverized and then put into 20 g of methyl ethyl ketone, followed by swelling at 25° C. for 24 hours. The resulting solution was titrated with a 0.1 KOH solution in methanol. An acid value in mgKOH/g of the adhesive protective film was determined by obtaining the amount of KOH used to titrate 1 g of the adhesive protective film to an equivalence point. The measurement was repeated three times to obtain an average.

TABLE 3

|  | Example | | | | | | | | | | Comparative |
|---|---|---|---|---|---|---|---|---|---|---|---|
|  | 1 | 2 | 3 | 4 | 5 | 6 | 7 | 8 | 9 | 10 | Example 1 |
| Preparative Example A1 | — | — | — | — | — | 100 | — | — | — | — | — |
| Preparative Example A2 | 100 | 100 | 100 | 100 | 100 | — | — | 100 | 100 | — | — |
| Preparative Example A3 | — | — | — | — | — | — | 100 | — | — | — | — |

TABLE 3-continued

| | Example | | | | | | | | | | Comparative |
| --- | --- | --- | --- | --- | --- | --- | --- | --- | --- | --- | --- |
| | 1 | 2 | 3 | 4 | 5 | 6 | 7 | 8 | 9 | 10 | Example 1 |
| Preparative Example A4 | — | — | — | — | — | — | — | — | — | 100 | — |
| Preparative Example A5 | — | — | — | — | — | — | — | — | — | — | 100 |
| Preparative Example B1 | 2.5 | — | — | — | — | — | — | — | — | — | — |
| Preparative Example B2 | — | 2.5 | — | — | — | 2.5 | 2.5 | 1 | 5 | 2.5 | 2.5 |
| Preparative Example B3 | — | — | 2.5 | — | — | — | — | — | — | — | — |
| Preparative Example B4 | — | — | — | 2.5 | — | — | — | — | — | — | — |
| Preparative Example B5 | — | — | — | — | 2.5 | — | — | — | — | — | — |
| Curing agent | 0.125 | 0.125 | 0.125 | 0.125 | 0.125 | 0.125 | 0.125 | 0.125 | 0.125 | 0.125 | 0.125 |
| Haze | 0.64 | 0.81 | 0.93 | 1.07 | 1.89 | 0.89 | 1.155 | 0.51 | 1.59 | 1.59 | 0.89 |
| Initial peel strength | 65 | 24 | 21 | 19 | 18 | 68 | 16 | 52 | 16 | 10 | 18 |
| Post-heating peel strength | 725 | 654 | 646 | 635 | 625 | 588 | 781 | 821 | 751 | 765 | 559 |
| Peel strength at high temperature | 561 | 552 | 499 | 482 | 475 | 433 | 471 | 525 | 428 | 437 | 155 |
| Value according to Equation 1 | 22.62 | 15.60 | 22.76 | 24.09 | 24 | 26.36 | 39.69 | 36.05 | 43.01 | 42.88 | 72.27 |
| Acid value of adhesive protective film | 9.17 | 9.17 | 9.17 | 9.17 | 9.17 | 8.84 | 9.52 | 9.18 | 9.15 | 9.61 | 0.1 |

As shown in Table 3, the adhesive protective films according to the present invention had low levels of haze and initial peel strength and a peel strength decrease rate of about 50% or less, as calculated according to Equation 1, and thus could reduce decrease in peel strength upon heat treatment while having high peel strength at high temperature.

While some embodiments of the present invention have been described herein, it should be understood that various modifications, changes, alterations, and equivalent embodiments can be made by those skilled in the art without departing from the spirit and scope of the invention.

What is claimed is:

1. An adhesive protective film formed of a composition comprising a (meth)acrylic binder derived from a monomer mixture comprising: an alkyl group-containing (meth)acrylic monomer; and at least one selected from among a hydroxyl group-containing (meth)acrylic monomer, a carboxyl group-containing (meth)acrylic monomer, or a polysiloxane (meth)acrylate,
   wherein the monomer mixture comprises the carboxyl group-containing (meth)acrylic monomer, and the carboxyl group-containing (meth)acrylic monomer is present in an amount of about 0.1 mol % to about 5 mol % in the (meth)acrylic binder,
   wherein the (meth)acrylic binder comprises a mixture of a first (meth)acrylic binder and a second (meth)acrylic binder, the second (meth)acrylic binder is a binder derived from a monomer mixture comprising a $C_{16}$ to $C_{22}$ linear or branched alkyl group-containing (meth)acrylic monomer and the polysiloxane (meth)acrylate, and
   wherein the adhesive protective film has an initial peel strength of about 100 gf/inch or less and a peel strength decrease rate of about 50% or less, as calculated according to the following Equation 1:

Peel strength decrease rate=[|peel strength at high temperature−post-heating peel strength|/post-heating peel strength]×100, where, in Equation 1, the post-heating peel strength is a peel strength (unit: gf/inch) of the adhesive protective film, as measured at 25° C. after leaving a specimen prepared by adhesively bonding the adhesive protective film to an adherend at 50° C. for 1,000 seconds and at 25° C. for 30 minutes, and the peel strength at high temperature is a peel strength (unit: gf/inch) of the adhesive protective film, as measured at 85° C. after leaving a specimen prepared by adhesively bonding the adhesive protective film to an adherend at 85° C. for 60 minutes.

2. The adhesive protective film according to claim 1, wherein the peel strength at high temperature in Equation 1 has a value of about 400 gf/inch or more.

3. The adhesive protective film according to claim 1, wherein the post-heating peel strength in Equation 1 has a value of about 500 gf/inch or more.

4. The adhesive protective film according to claim 1, wherein the adhesive protective film has an acid value of greater than about 0 mgKOH/g to about 15 mgKOH/g.

5. The adhesive protective film according to claim 1, wherein the adhesive protective film has a glass transition temperature of about −35° C. to about −10° C.

6. The adhesive protective film according to claim 1, wherein the polysiloxane (meth)acrylate is present in an amount of about 0.001 mol % to about 1 mol % in the (meth)acrylic binder.

7. The adhesive protective film according to claim 1, wherein the polysiloxane (meth)acrylate comprises a compound represented by the following Formula 1:

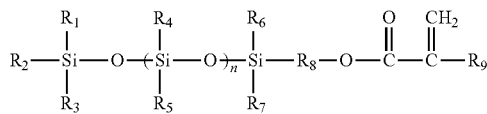

where, in Formula 1, $R_1$, $R_2$, $R_3$, $R_4$, $R_5$, $R_6$, and $R_7$ are each independently hydrogen, a $C_1$ to $C_{10}$ alkyl group, a $C_3$ to $C_{10}$ cycloalkyl group, or a $C_6$ to $C_{10}$ aryl group, $R_8$ is a $C_1$ to $C_{10}$ alkylene group, a $C_6$ to $C_{10}$ arylene group, or a $C_1$ to $C_{10}$ alkyleneoxy group, $R_9$ is hydrogen or a methyl group, and n is an integer from 1 to 100.

8. The adhesive protective film according to claim 1, wherein the alkyl group-containing (meth)acrylic monomer comprises at least one selected from among a $C_1$ to $C_{15}$ linear or branched alkyl group-containing (meth)acrylic monomer or a $C_{16}$ to $C_{22}$ linear or branched alkyl group-containing (meth)acrylic monomer.

9. The adhesive protective film according to claim 1, wherein the alkyl group-containing (meth)acrylic monomer is present in an amount of about 50 mol % to about 98 mol % in the (meth)acrylic binder, and the hydroxyl group-containing (meth)acrylic monomer is present in an amount of about 0.01 mol % to about 45 mol % in the (meth)acrylic binder.

10. The adhesive protective film according to claim 1, wherein the first (meth)acrylic binder is derived from a monomer mixture comprising the alkyl group-containing (meth)acrylic monomer, the hydroxyl group-containing (meth)acrylic monomer, and the carboxyl group-containing (meth)acrylic monomer.

11. The adhesive protective film according to claim 10, wherein the alkyl group-containing (meth)acrylic monomer in the monomer mixture for the first (meth)acrylic binder comprises a $C_1$ to $C_{15}$ linear or branched alkyl group-containing (meth)acrylic monomer.

12. The adhesive protective film according to claim 11, wherein the monomer mixture for the first (meth)acrylic binder comprises about 60 mol % to about 98 mol % of the $C_1$ to $C_{15}$ linear or branched alkyl group-containing (meth) acrylic monomer, about 0.1 mol % to about 35 mol % of the hydroxyl group-containing (meth)acrylic monomer, and about 1 mol % to about 13 mol % of the carboxyl group-containing (meth)acrylic monomer.

13. The adhesive protective film according to claim 11, wherein the monomer mixture for the first (meth)acrylic binder further comprises an amide group-containing monomer.

14. The adhesive protective film according to claim 13, wherein the amide group-containing monomer comprises a pyrrolidonyl group-containing monomer.

15. The adhesive protective film according to claim 13, wherein the amide group-containing monomer is present in an amount of about 0.1 mol % to about 20 mol % in the monomer mixture for the first (meth)acrylic binder.

16. The adhesive protective film according to claim 1, wherein the monomer mixture for the second (meth)acrylic binder comprises about 90 mol % to about 98.99 mol % of the $C_{16}$ to $C_{22}$ linear or branched alkyl group-containing (meth)acrylic monomer and about 1.01 mol % to about 10 mol % of the polysiloxane (meth)acrylate.

17. The adhesive protective film according to claim 10, wherein the second (meth)acrylic binder is present in an amount of less than about 10 parts by weight relative to 100 parts by weight of the first (meth)acrylic binder.

18. The adhesive protective film according to claim 10, wherein the first (meth)acrylic binder has a glass transition temperature of about −35° C. or higher.

19. The adhesive protective film according to claim 1, wherein the composition further comprises a heat curing agent.

20. The adhesive protective film according to claim 1, wherein the carboxyl group-containing (meth)acrylic monomer is present in an amount of about 0.5 mol % to about 3 mol % in the (meth)acrylic binder.

21. An optical member comprising the adhesive protective film according to claim 1.

22. An optical display comprising the adhesive protective film according to claim 1.

* * * * *